US012782905B2

(12) United States Patent
Tachiki et al.

(10) Patent No.: US 12,782,905 B2
(45) Date of Patent: Nov. 3, 2026

(54) MACHINE TOOL CONTROL DEVICE, AND MACHINE TOOL

(71) Applicant: FANUC CORPORATION, Minamitsuru-gun (JP)

(72) Inventors: Shingo Tachiki, Yamanashi (JP); Yuki Tsuchida, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 322 days.

(21) Appl. No.: 18/692,181

(22) PCT Filed: Nov. 26, 2021

(86) PCT No.: PCT/JP2021/043406
§ 371 (c)(1),
(2) Date: Mar. 14, 2024

(87) PCT Pub. No.: WO2023/095286
PCT Pub. Date: Jun. 1, 2023

(65) Prior Publication Data
US 2024/0377804 A1 Nov. 14, 2024

(51) Int. Cl.
*G05B 19/00* (2006.01)
*B23B 7/12* (2006.01)
*G05B 19/402* (2006.01)

(52) U.S. Cl.
CPC .............. *G05B 19/402* (2013.01); *B23B 7/12* (2013.01); *G05B 2219/45136* (2013.01)

(58) Field of Classification Search
CPC ........ G05B 19/402; G05B 2219/45136; G05B 19/404; B23B 7/12; B23B 25/06
See application file for complete search history.

(56) References Cited

U.S. PATENT DOCUMENTS

| | | | |
|---|---|---|---|
| 2005/0103135 A1 | 5/2005 | Forster et al. | |
| 2012/0097411 A1 | 4/2012 | Yoshino et al. | |

(Continued)

FOREIGN PATENT DOCUMENTS

| | | |
|---|---|---|
| CN | 110315093 A | 10/2019 |
| CN | 110421400 A | 11/2019 |

(Continued)

OTHER PUBLICATIONS

International Search Report issued in PCT/JP2021/043406; mailed Feb. 1, 2022.

*Primary Examiner* — Aleksey Olshannikov
(74) *Attorney, Agent, or Firm* — Studebaker Brackett PLLC

(57) ABSTRACT

A machine tool control device according to one aspect of the present disclosure, which can prevent a workpiece from flying out, comprises: a total turning inertia estimation unit that, estimates the total turning inertia on the basis of feedback from a turning axis by causing the turning axis to rotate, said total turning inertia being the total inertia, around the turning axis, of the turning axis and an object that rotates together with the turning axis; a workpiece turning inertia estimation unit that estimates the workpiece turning inertia on the basis of the total turning inertia when a retention unit is not retaining a workpiece and the total turning inertia when the retention unit is retaining a workpiece, said workpiece turning inertia being the inertia, around the turning axis, of the workpiece; a maximum rotational speed calculation unit that, on the basis of the workpiece turning inertia, calculates the maximum rotational speed of the turning axis, at which the maximum energy when the workpiece separates from the retention unit is equal to a preset upper limit value; and a rotational speed limiting unit that limits the rotational (Continued)

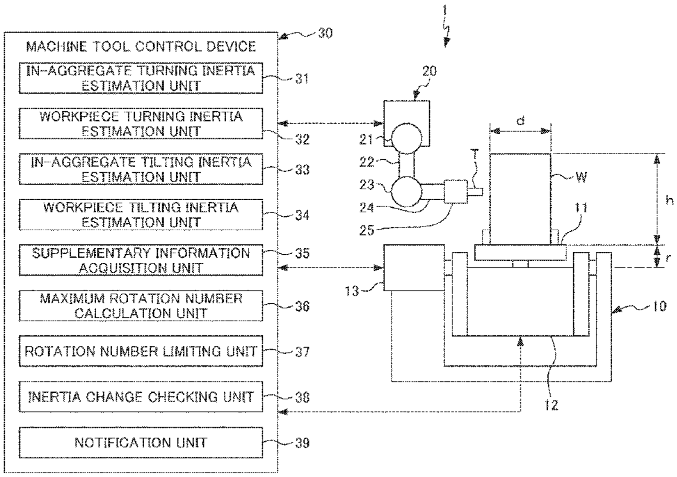

speed of the turning axis so as not to exceed the maximum rotational speed.

7 Claims, 1 Drawing Sheet

(56) References Cited

U.S. PATENT DOCUMENTS

| | | | | |
|---|---|---|---|---|
| 2013/0342143 | A1* | 12/2013 | Sonoda | H02P 3/22 318/400.21 |
| 2014/0114462 | A1* | 4/2014 | Yoshino | G05B 19/404 700/170 |
| 2014/0132194 | A1* | 5/2014 | Okita | B23Q 5/58 318/563 |
| 2017/0250645 | A1* | 8/2017 | Tateda | H02P 6/24 |
| 2018/0297163 | A1 | 10/2018 | Sonoda et al. | |
| 2018/0299247 | A1* | 10/2018 | Honda | G01G 5/02 |
| 2020/0293005 | A1* | 9/2020 | Oyamada | B23Q 3/15534 |

FOREIGN PATENT DOCUMENTS

| | | | |
|---|---|---|---|
| CN | 109299567 | B | 1/2023 |
| JP | 2014-007816 | A | 1/2014 |
| JP | 2014-079867 | A | 5/2014 |
| JP | 2014-096929 | A | 5/2014 |
| JP | 2015055923 | A * | 3/2015 |
| JP | 2018-179849 | A | 11/2018 |
| JP | 6839783 | B1 | 3/2021 |

* cited by examiner

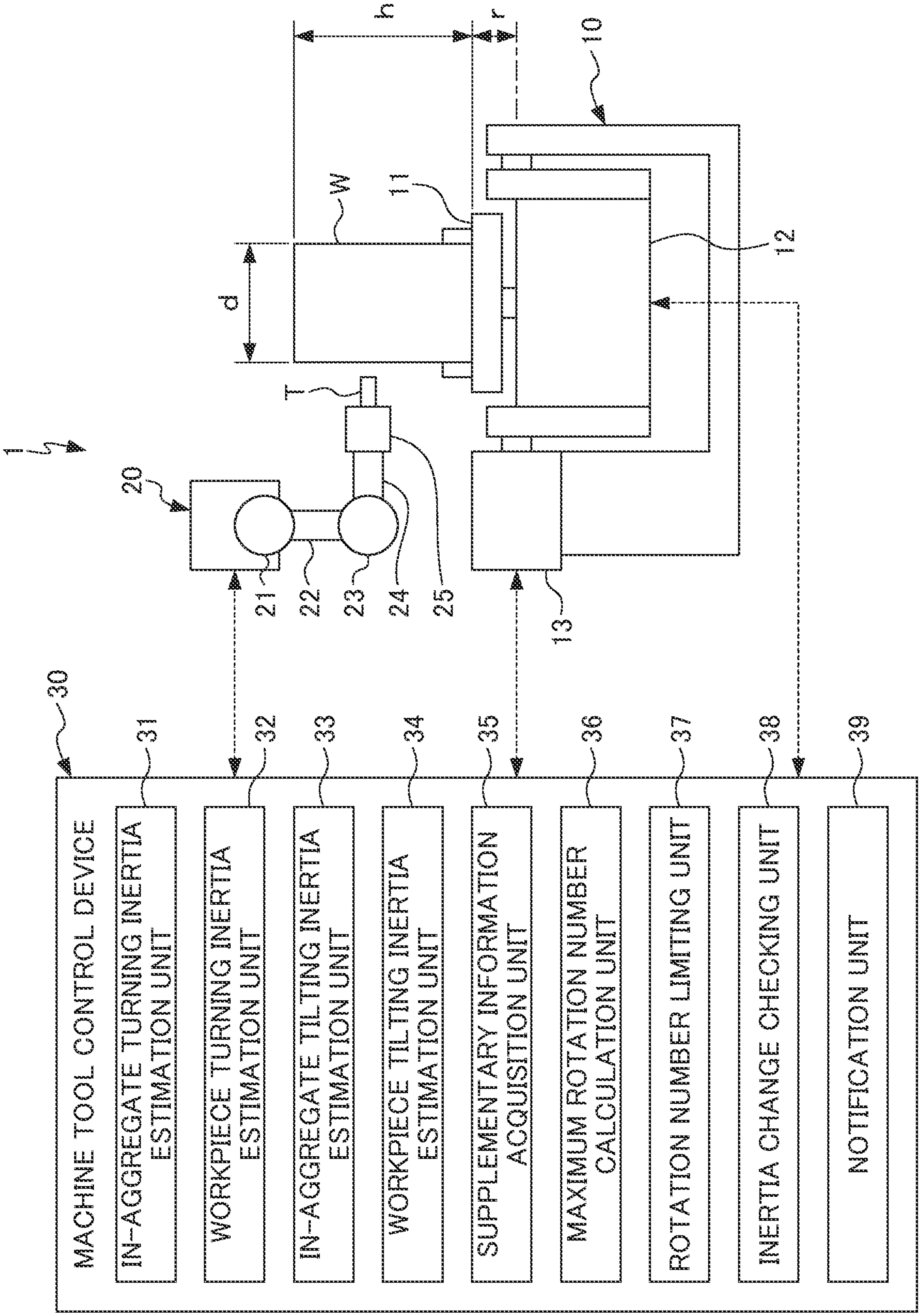
1
10
11
12
13
20
21
22
23
24
25
W
T
d
h
r
30
MACHINE TOOL CONTROL DEVICE
31
IN-AGGREGATE TURNING INERTIA ESTIMATION UNIT
32
WORKPIECE TURNING INERTIA ESTIMATION UNIT
33
IN-AGGREGATE TILTING INERTIA ESTIMATION UNIT
34
WORKPIECE TILTING INERTIA ESTIMATION UNIT
35
SUPPLEMENTARY INFORMATION ACQUISITION UNIT
36
MAXIMUM ROTATION NUMBER CALCULATION UNIT
37
ROTATION NUMBER LIMITING UNIT
38
INERTIA CHANGE CHECKING UNIT
39
NOTIFICATION UNIT

MACHINE TOOL CONTROL DEVICE, AND MACHINE TOOL

TECHNICAL FIELD

The present invention relates to a machine tool control device and a machine tool.

BACKGROUND ART

There is a known machine tool that performs lathe turning by rotating a turning axis provided with a holder such as a chuck for holding a workpiece. The kinetic energy of the rotation of a rotating body including the turning axis and the workpiece during turning is significantly larger than the kinetic energy of a rotating body during milling, for example. In a case where the inertia (inertial moment) possessed by the workpiece and centered on the turning axis is large, the capacity of a brake for emergency-stopping the turning axis may be exceeded. For this reason, a technique has been proposed in which the inertia of a rotating body is estimated, the risk is notified when the estimated value of the inertia is large, and the rotation speed is limited according to the inertia (for example, see Patent Document 1).

CITATION LIST

Patent Document

Patent Document 1: Japanese Patent No. 6839783

DISCLOSURE OF THE INVENTION

Problems to be Solved by the Invention

During turning, in which the workpiece is rotated at a relatively high speed, if the workpiece is detached from the holder, the workpiece may fly out to the outside. In particular, in a case where the workpiece is held eccentrically, there is a high risk that the workpiece is detached to fly out. Some machine tools include a cover or the like for preventing the scattering of chips, but there is a possibility that such covers would not be enough to prevent a workpiece having a large mass from flying out. Therefore, there is a demand for a technology capable of preventing a workpiece from flying out in the case where the workpiece is detached during turning.

Means for Solving the Problems

As aspect of the present disclosure is directed to a machine tool control device for controlling a machine tool that performs turning by rotating a turning axis provided with a holder that holds a workpiece. The machine tool control device includes: an in-aggregate turning inertia estimation unit configured to estimate an in-aggregate turning inertia based on feedback from the turning axis by causing the turning axis to rotate, the in-aggregate turning inertia being possessed by an aggregate of the turning axis and an object rotating together with the turning axis and being around the turning axis; a workpiece turning inertia estimation unit configured to estimate workpiece turning inertia based on the in-aggregate turning inertia that is present when the holder does not hold the workpiece and the in-aggregate turning inertia that is present when the holder holds the workpiece, the workpiece turning inertia being possessed by the workpiece and being around the turning axis; a maximum rotation number calculation unit configured to calculate, based on the workpiece turning inertia, a maximum rotation number of the turning axis such that at the maximum rotation number calculated, maximum energy of the workpiece at a time of detachment of the workpiece from the holder becomes equal to a preset upper limit value; and a rotation number limiting unit configured to limit a rotation number of the turning axis so as to prevent the rotation number from exceeding the maximum rotation number,

Effects of the Invention

According to the present disclosure it is prevented a workpiece from flying out

BRIEF DESCRIPTION OF THE DRAWINGS

FIG. 1 is a schematic view illustrating a configuration of a machine tool according to a first embodiment of the present disclosure.

PREFERRED MODE FOR CARRYING OUT THE INVENTION

Embodiments of the present disclosure will be described below with reference to the drawings. FIG. 1 is a schematic view illustrating a configuration of a machine tool 1 according to a first embodiment of the present disclosure.

The machine tool 1 includes a turntable mechanism 10 that positions a workpiece W, a tool positioning mechanism 20 that drives a tool T for machining the workpiece w, and a machine tool control device 30 that controls operation of the turntable mechanism 10 and operation of the tool positioning mechanism 20, i.e., operation of the machine tool 1. The machine tool 1 of the present embodiment is a machining center capable of performing turning. The machine tool 1 may further include a tool changer (not shown), etc.

The turntable mechanism 10 includes a holder 11 that holds a workpiece, a turning axis 12 that is provided with the holder 11 at a leading end thereof and that rotates the holder 11, and a tilting axis 13 that tilts the turning axis 12. The turntable mechanism 10 may further include one or more positioning axes (not shown) for moving the foregoing components horizontally or vertically, for example.

The holder 11 may be a well-known configuration such as a table capable of fixing the workpiece W or a chuck. The turning axis 12 is a driving axis capable of rotating and positioning or continuously rotating the holder 11. The machine tool 1 can perform turning on the workpiece W by continuously rotating the turning axis 12. The tilting axis 13 is capable of tilting the turning axis 12. In the present specification, the term “axis” means a drive mechanism including a drive motor and having one degree of freedom.

The tool positioning mechanism 20 may have a plurality of driving axes 21, 22, 23, and 24 so that the tool positioning mechanism 20 can hold and bring the tool T into contact with a desired point on the workpiece W in a desired direction. The tool positioning mechanism 20 may include a tool driving axis 25 for rotating the tool T.

The machine tool control device 30 is per se an embodiment of the machine tool control device according to the present disclosure. The machine tool control device 30 controls the entire machine tool 1 such that the turntable mechanism 10 and the tool positioning mechanism 20 operate according to a machining program to thereby machine the workpiece W.

The machine tool control device 30 according to the present embodiment includes an in-aggregate turning inertia estimation unit 31, a workpiece turning inertia estimation unit 32, an in-aggregate tilting inertia estimation unit 33, a workpiece tilting inertia estimation unit 34, a supplementary information acquisition unit 35, a maximum rotation number calculation unit 36, a rotation number limiting unit 37, an inertia change checking unit 38, and a notification unit 39.

The machine tool control device 30 can be implemented by causing a computer device including, for example, a processor, a memory, an input/output interface, and the like to execute an appropriate control program. The above-described components of the machine tool control device 30 refer to functions of the machine tool control device 30 classified as appropriate, and do not have to be clearly distinguishable from each other in terms of physical configuration and program configuration.

The in-aggregate turning inertia estimation unit 31 estimates, based on feedback from the turning axis 12 by causing the turning axis 12 to rotate, in-aggregate turning inertia Iac [$kgm^2$] that is possessed by an aggregate of the turning axis 12 and objects (including the holder 11, the workpiece W, a jig for fixing the workpiece W, a fastener, etc.) rotating together with the turning axis 12, and that is around the turning axis 12. Specifically, for example, the in-aggregate turning inertia estimation unit 31 may be configured to derive an estimated value of the in-aggregate turning inertia Iac by dividing a representative value (e.g., an average value) of torque calculated based on a current value of a motor of the turning axis 12 by a representative value of angular acceleration calculated based on a feedback value of a rotational position (representative value of torque/representative value of angular acceleration).

The workpiece turning inertia estimation unit 32 estimates workpiece turning inertia Iwc [$kgm^2$] that is possessed by the workpiece W and is around the turning axis 12, based on in-aggregate turning inertia $Iac_0$ that is present when the holder 11 does not hold the workpiece W and in-aggregate turning inertia $Iac_1$ that is present when the holder 11 holds the workpiece W. The workpiece turning inertia Iwc can be derived as a value obtained by subtracting the in-aggregate turning inertia $Iac_0$ that is present when the workpiece W is not held from the in-aggregate turning inertia $Iac_1$ that is present when the workpiece W is held ($Iac_1$-$Iac_0$).

The in-aggregate tilting inertia estimation unit 33 estimates in-aggregate tilting inertia Iat [$kgm^2$] by causing the tilting axis 13, which tilts the workpiece W, to rotate. The in-aggregate tilting inertia Iat is estimated based on feedback from the tilting axis 13, possessed by an aggregate of the tilting axis 13 and objects (including the turning axis 12, the holder 11, the workpiece W, the jig for fixing the workpiece W, the fastener, etc.) rotating together with the tilting axis 13, and is around the tilting axis 13. An estimated value of the in-aggregate tilting inertia Iat may be calculated in the same manner as in the case of the estimated value of the in-aggregate turning inertia Iac.

The workpiece tilting inertia estimation unit 34 estimates workpiece tilting inertia Iwt [$kgm^2$] that is possessed by the workpiece W and is around the tilting axis 13, based on in-aggregate tilting inertia $Iat_0$ that is present when the holder 11 does not hold the workpiece W and in-aggregate tilting inertia Iat, that is present when the holder 11 holds the workpiece W. The workpiece tilting inertia Iwt is calculated as a difference between the in-aggregate tilting inertia $Iat_0$ that is present when the holder 11 does not hold the workpiece W and the in-aggregate tilting inertia $Iat_1$ that is present when the holder 11 holds the workpiece W ($Iat_1$-$Iat_0$). Note that in a case of a configuration in which the holder 11 cannot be changed by the user, the in-aggregate tilting inertia $Iat_0$ may be set to a known value, and using the known value leads to a decrease in an estimation error.

The supplementary information acquisition unit 35 acquires supplementary information including the density of the workpiece W. The supplementary information acquisition unit 35 may be configured to read supplementary information described in a machining program, and may be configured to provide a user interface that prompts the user to input supplementary information. The density of the workpiece W may be acquired with reference to a reference table in which correspondence relationships between materials and densities is stored, and based on the material of the workpiece W specified in a machining program or in an input by the user.

The maximum rotation number calculation unit 36 calculates, based on at least the workpiece turning inertia Iwc, a maximum rotation number of the turning axis 12 such that at the calculated maximum rotation number, maximum energy Jw [J] of the workpiece W at a time of detachment of the workpiece W from the holder 11 becomes equal to a preset upper limit value Ju [J]. The maximum rotation number calculation unit 36 may calculate the maximum energy Jw on the assumption that all of rotational energy of the workpiece W is converted into kinetic energy of the workpiece W at the time of detachment of the workpiece W from the holder 11.

In this case, the maximum energy Jw [J] of the workpiece W at the time of detachment of the workpiece W from the holder 11 can be calculated according to the following equation (1) in which the rotation number of the workpiece W is represented by n [rpm].

$$Jw = 1/2 \cdot Iwc \cdot (2\pi n/60)^2 \tag{1}$$

On the other hand, the upper limit value of the maximum energy Jw is set to a value obtained by multiplying energy that can break a safety cover of the machine tool 1 by a safety factor (breaking energy×safety factor). The energy capable of breaking the safety cover can be determined by way of an impact resistance test on the safety cover.

The maximum rotation number calculation unit 36 may calculate the maximum rotation number in consideration of the supplementary information. For example, considering the density of the workpiece W and diameter and length (shape) of the workpiece W allows for limiting the maximum rotation number to a maximum rotation number that satisfies both a maximum rotation number determined based on workpiece turning inertia Iwc that is theoretically calculated and a maximum rotation number determined based on the workpiece turning inertia Iwc estimated by the workpiece turning inertia estimation unit 32, thereby making it possible to perform machining at a safer rotation number with a reduced possibility of error in the estimated inertia and/or the supplementary information.

The maximum rotation number calculation unit 36 may calculate the maximum rotation number in consideration of the workpiece tilting inertia Iwt as well. The shape of the workpiece W can be estimated by considering the workpiece turning inertia Iwc and the workpiece tilting inertia Iwt. This makes it possible to more accurately estimate the maximum energy Jw of the workpiece W that is released at the time of detachment of the workpiece W.

Here, the distance from the rotation center of the tilting axis 13 to a mounting surface of the workpiece W is defined as r [m], and the workpiece W is assumed to have a circular columnar shape with a height h [m] and a diameter d [m], and have a density p [kg/m$^3$]. In this case, the workpiece turning inertia Iwc can be expressed by the following equation (2).

$$Iwt = 1/32 \cdot \rho\pi d^4 h \tag{2}$$

The workpiece tilting inertia Iwt can be expressed by the following equation (3).

$$Iwt = 1/16 \cdot \rho\pi d^2 h\{(d^2/4 + h^2/3) + 4(r + h/2)^2\} \tag{3}$$

Accordingly, if the distance r from the rotation center of the tilting axis 13 to the mounting surface of the workpiece W and the density p of the workpiece W are known, the height h and the diameter d of the workpiece W can be derived by substituting the estimated values of the workpiece turning inertia Iwc and the workpiece tilting inertia Iwt into the two equations described above. The distance r from the rotation center of the tilting axis 13 to the mounting surface of the workpiece W is inputted in advance, at the time of machine start-up involving attaching the holder 11. The density p of the workpiece W may be acquired by the supplementary information acquisition unit 35. Alternatively, in a case where the supplementary information acquisition unit 35 cannot acquire the density p, the density p may be calculated using 7.9 g/cm$^3$, which is the density of steel and stainless steel that are typical materials for workpieces W.

In a case where the above-described estimation indicates that the workpiece W has a vertically oriented circular columnar shape with a relationship represented by $d<h$, if the workpiece W is rotated while being tilted with respect to the rotation center line, energy may become larger than the energy calculated according to the equation (1). In a case where the workpiece W is held by the holder 11 while having one end face thereof positioned on the rotation center line of the turning axis 12 and the center line thereof tilted at an angle θ [°] with respect to the rotation center line of the turning axis 12, the maximum energy Jw of the workpiece W at the time of detachment of the workpiece W can be expressed by the following equation (4). The angle θ may be set to a value obtained experimentally. For example, the angle θ may be set to a constant value such as θ=30°, or may be changed according to a ratio between d and h.

$$Jw = 1/8 \cdot \rho\pi d^2 h \cdot \{\pi h(n/60)\sin\theta\}^2 + 1/16 \cdot \rho\pi d^2 h \cdot (d^2/4 + h^2/3) \cdot \{\pi(n/60)\sin\theta\} \tag{4}$$

Here, on the assumption that $d<h$ and $d^2<<h^2$, the equation (4) can be simplified as the following equation (5).

$$Jw = 1/6 \cdot \rho\pi^3 d^2 h^3 \cdot (n/60)^2 \sin^2\theta \tag{5}$$

Using this equation allows for more accurately estimating the maximum energy Jw of the workpiece W at the time of detachment of the workpiece W, whereby even when the workpiece W has a vertically oriented shape having the relationship represented by $d<h$, it is possible to perform machining at a safe maximum rotation number, i.e., a rotation number n at which the maximum energy Jw is equal to the upper limit value Ju.

The maximum rotation number calculation unit 36 may be configured to accept the user's approval or correction to the maximum rotation number calculated as described above. The maximum rotation number may be corrected such that a value calculated by reducing the safety factor to a predetermined limiting value is set to the upper limit of the maximum rotation number.

The rotation number limiting unit 37 limits the rotation number of the turning axis 12 so as not to exceed the maximum rotation number. The upper limit value of the rotation number of the turning axis 12 may be set to the maximum rotation number calculated by the maximum rotation number calculation unit 36 or a maximum value settable within a range not exceeding the maximum rotation number. A well-known method can be adopted as a method of limiting the rotation number of the turning axis 12, i.e., a method of limiting the rotation number of the workpiece W during turning.

The inertia change checking unit 38 causes the in-aggregate turning inertia estimation unit 31 to estimate the in-aggregate turning inertia Iac at a predetermined timing, and checks a change in the in-aggregate turning inertia Iac and hence a change in the workpiece turning inertia Iwc. The change in the workpiece turning inertia Iwc is checked at an appropriately selected timing, such as at the time of replacement of the workpiece W, at the time of start of execution of a machining program, every predetermined period of operation, or at a fixed time. The inertia change checking unit 38 may be configured to be able to check a change in the workpiece turning inertia Iwc in response to instructions by the user.

The inertia change checking unit 38 may be configured to check a change in the workpiece turning inertia Iwc in the middle of execution of a machining program. Since the workpiece turning inertia Iwc in the middle of machining becomes smaller than that at the start of the machining, the maximum rotation number calculated by the maximum rotation number calculation unit 36 becomes smaller. As a result, the limitation on the rotation number of the turning axis 12 by the rotation number limiting unit 37 is alleviated, and accordingly, the machining speed can be increased in accordance with the decrease in the workpiece turning inertia Iwc. The inertia is estimated at an appropriately selected timing, such as at a timing instructed in a program, at an arbitrary timing at which the rotation of the workpiece W is stopped, etc. The in-aggregate turning inertia Iac may be estimated based on acceleration/deceleration during machining on the workpiece W.

In a case where the maximum rotation number calculated by the maximum rotation number calculation unit 36 is smaller than a preset value or a value required for turning derived from a machining program, the notification unit 39 notifies that the rotation number is to be limited. As a way of notification, a visual signal, an audible signal, etc. may be used. Alternatively, a signal may be transmitted to the outside so that the notification will be handled by an external device.

When the maximum rotation number is excessively small, it is highly probable that the workpiece W is held while being tilted with respect to the turning axis 12, and the workpiece W is highly likely to be detached from the holder 11. Therefore, when the maximum rotation number is smaller than the preset value, the user is notified of the risk, so that detachment of the workpiece W can be prevented by way of adjustment of the state in which the workpiece W is held, for example. In the case where the maximum rotation number is smaller than the value required for turning, the user is notified that a desired machining condition cannot be achieved or a long machining time may be required, thereby prompting the user to consider whether or not the state in which the workpiece W is held needs to be adjusted.

The machine tool 1 including the machine tool control device 30 described above can set the maximum rotation number of the turning axis 12 to an optimal value in accordance with the workpiece W and the jig for fixing the workpiece W to the holder. This feature makes it possible not only to prevent the rotation number from being reduced more than necessary and but also to prevent the workpiece W from being machined at a hazardous rotation number, whereby the workpiece W can be machined efficiently and safely. Furthermore, according to the machine tool 1, since the machine tool control device 30 estimates the workpiece turning inertia Iwc and sets the maximum rotation number of the turning axis 12, the user does not need to calculate the inertia. By virtue of this feature, the machine tool 1 allows for shortening the set up time required for machining of the workpiece W.

It should be noted that the present invention is not limited to the above-described embodiments of the present disclosure. The effects described in the above embodiments are merely favorable ones of the effects exerted by the present invention. The effects of the present invention are not limited to those described in relation to the above-described embodiments.

In the machine tool control device according to the present disclosure, the in-aggregate tilting inertia estimation unit, the workpiece tilting inertia estimation unit, the supplementary information acquisition unit, the inertia change checking unit, and the notification unit are optional components and may be omitted.

In the machine tool according to the present disclosure, the configurations of the turntable mechanism and the tool positioning mechanism are not limited to those described in the above embodiments. Specifically, for example, the machine tool according to the present disclosure may be configured as an NC lathe, and the turntable mechanism may be devoid of the tilting axis.

EXPLANATION OF REFERENCE NUMERALS

1: Machine tool
10: Turntable mechanism
20: Tool positioning mechanism
30: Machine tool control device
11: Holder
12: Turning axis
13: Tilting axis
21, 22, 23, 24: Driving axis
25: Tool driving axis
31: In-aggregate turning inertia estimation unit
32: Workpiece turning inertia estimation unit
33: In-aggregate tilting inertia estimation unit
34: Workpiece tilting inertia estimation unit
35: Supplementary information acquisition unit
36: Maximum rotation number calculation unit
37: Rotation number limiting unit
38: Inertia change checking unit
39: Notification unit
W: Workpiece
T: tool

The invention claimed is:

1. A machine tool control device for controlling a machine tool that performs turning by rotating a turning axis provided with a holder that holds a workpiece, the machine tool control device comprising a processor, wherein the processor:

estimates in-aggregate turning inertia based on feedback from the turning axis by causing the turning axis to rotate, the in-aggregate turning inertia being possessed by an aggregate of the turning axis and an object rotating together with the turning axis and being around the turning axis;

estimates workpiece turning inertia based on the in-aggregate turning inertia that is present when the holder does not hold the workpiece and the in-aggregate turning inertia that is present when the holder holds the workpiece, the workpiece turning inertia being possessed by the workpiece and being around the turning axis;

calculates, based on the workpiece turning inertia, a maximum rotation number of the turning axis such that at the maximum rotation number calculated, maximum energy of the workpiece at a time of detachment of the workpiece from the holder becomes equal to a preset upper limit value; and limits a rotation number of the turning axis so as to prevent the rotation number from exceeding the maximum rotation number.

2. The machine tool control device according to claim 1, wherein the processor further acquires supplementary information including a density of the workpiece; and calculates the maximum rotation number in consideration of the supplementary information.

3. The machine tool control device according to claim 1, wherein the processor further estimates in-aggregate tilting inertia based on feedback from a tilting axis by causing the tilting axis to rotate, the tilting axis being configured to tilt the workpiece, the in-aggregate tilting inertia being possessed by an aggregate of the tilting axis and an object rotating together with the tilting axis and being around the tilting axis;

estimates workpiece tilting inertia based on the in-aggregate tilting inertia that is present when the holder does not hold the workpiece and the in-aggregate tilting inertia that is present when the holder holds the workpiece, the workpiece tilting inertia being possessed by the workpiece and being around the tilting axis; and calculates the maximum rotation number in consideration of the workpiece tilting inertia.

4. The machine tool control device according to claim 1, wherein the processor estimates the in-aggregate turning inertia at a predetermined timing, and check a change in the in-aggregate turning inertia.

5. The machine tool control device according to claim 4, wherein the processor estimates the in-aggregate turning inertia in a middle of execution of a machining program so that limitation of the rotation number is alleviated in accordance with a decrease in the workpiece turning inertia.

6. The machine tool control device according to claim 1, wherein the processor further provides a notification in a case where the maximum rotation number is smaller than a preset value or a value required for the turning.

7. A machine tool including the machine tool control device according to claim 1.

* * * * *